United States Patent

[11] 3,626,143

| [72] | Inventor | Franklin Hornor Fry<br>Appleton, Wis. |
| --- | --- | --- |
| [21] | Appl. No. | 812,764 |
| [22] | Filed | Apr. 2, 1969 |
| [45] | Patented | Dec. 7, 1971 |
| [73] | Assignee | American Can Company<br>New York, N.Y. |

[54] SCORING OF MATERIALS WITH LASER ENERGY
3 Claims, 2 Drawing Figs.

[52] U.S. Cl. .................................................. 219/121
[51] Int. Cl. .................................................. B23k 9/00
[50] Field of Search ......................................... 219/121

[56] References Cited
UNITED STATES PATENTS
3,400,456  9/1968  Hanfmann .................... 219/121
3,465,091  9/1969  Bradham ...................... 219/121

*Primary Examiner*—J. V. Truhe
*Assistant Examiner*—Lawrence A. Rouse
*Attorneys*—Robert P. Auber and Leonard R. Hohan ABSTRACT: A process in which a groove or score is generated in a thermoplastic substrate. A focused continuous beam of laser light is directed against the substrate and relative motion is applied between the beam and the substrate. The laser beam is generated and focused with suitable optics so that the beam has sufficient energy density to degrade the plastic material. The relative velocity between the beam and the substrate is such that the beam degrades the substrate without cutting through the substrate and thereby forms a groove in the substrate with a bead bordering the groove.

PATENTED DEC 7 1971 3,626,143

INVENTOR.
FRANKLIN HORNOR FRY
BY
ATTORNEY

SCORING OF MATERIALS WITH LASER ENERGY

BACKGROUND OF THE INVENTION

This invention relates to a process for grooving or scoring thermoplastic materials to form a weakened line therein and more specifically to the utilization of a laser beam in scoring thermoplastics.

The term laser is an acronym for light amplification by stimulated emission of radiation. As is well known, the laser emits a monochromatic high-energy beam of low divergence. These properties have a number of advantages in industrial materials processing applications. In addition to high-energy or high-power density available from the beam, precise beam control with simple lenses and mirrors is possible, and the tool, the laser in this case, requires no contact with the workpiece.

Two types of lasers are available for consideration as industrial tools. The first, the pulsed laser, emits short, very high-power pulses but can only be pulsed a few times a second. The second type of laser, the continuous laser, emits high power at a steady rate. Of the two, the best candidate for industrial applications is the continuous laser because it delivers substantially greater total energy than the pulsed device. Of the continuous lasers, the nitrogen-carbon dioxide laser emits considerable power. At the present time lasers of this type have been known to produce 10,000 watts.

As is well known, plastics have two different response mechanisms to temperature increase. The first is reversible and involves softening or melting of the plastic. In the molten state the plastic flows and joining and forming are possible. Another response by plastics to increased temperature is decomposition. Decomposition predominates at temperatures from 50° to 100° C. above the thermoplastic melting point. The kind of decomposition occurring depends upon the atmosphere surrounding the workpiece and the extent of decomposition depends upon the time and the substrate. For purposes herein, melting, evaporation and decomposition shall be discussed as degradation-type reactions.

In decomposition enough heat is supplied to the substrate to completely vaporize the regions upon which the beam impinges. If the beam is properly controlled, the energy output at all points in the beam will be adequate to vaporize the substrate without affecting the regions adjacent the area where the beam impinges.

The energy in a laser beam drops off more or less gradually outwardly from the beam center. However, it is possible to come quite close to the ideal energy distribution with existing lasers. The laser has a unique property with regard to thermoprocessing of plastics. This is the fact that heat is generated by absorption of the beam within the material. This means that the initial hot spot in plastics irradiated by the laser beam is within the material and not on the surface.

It is therefore an object of the present invention to provide an improved method for working thermoplastic materials.

Another object of the present invention is to provide an improved method for scoring or grooving thermoplastics.

It is a further object of the present invention to provide a method for scoring or grooving thermoplastic materials without mechanically contacting the workpiece.

Yet another object of the present invention is to provide a method for utilizing a laser beam to work materials.

Numerous other objects and advantages of the invention will be apparent as it is better understood from the following description, which, taken in connection with the accompanying drawings, discloses a preferred embodiment thereof.

SUMMARY OF THE INVENTION

A process for grooving thermoplastic sheet with a laser beam. A continuous concentrated beam of laser light is directed onto a thermoplastic sheet. The energy density of the beam is sufficient to degrade or melt the thermoplastic. During the grooving or scoring the beam is moved relative to the thermoplastic sheet and the movement rate is such that the beam degrades the thermoplastic without cutting through the sheet, thereby forming a groove or score in the thermoplastic having a bead that has been formed during the operation bordering the groove.

BRIEF DESCRIPTION OF THE DRAWING

Referring to the drawing.

DESCRIPTION OF THE PREFERRED EMBODIMENTS

Figure 1:
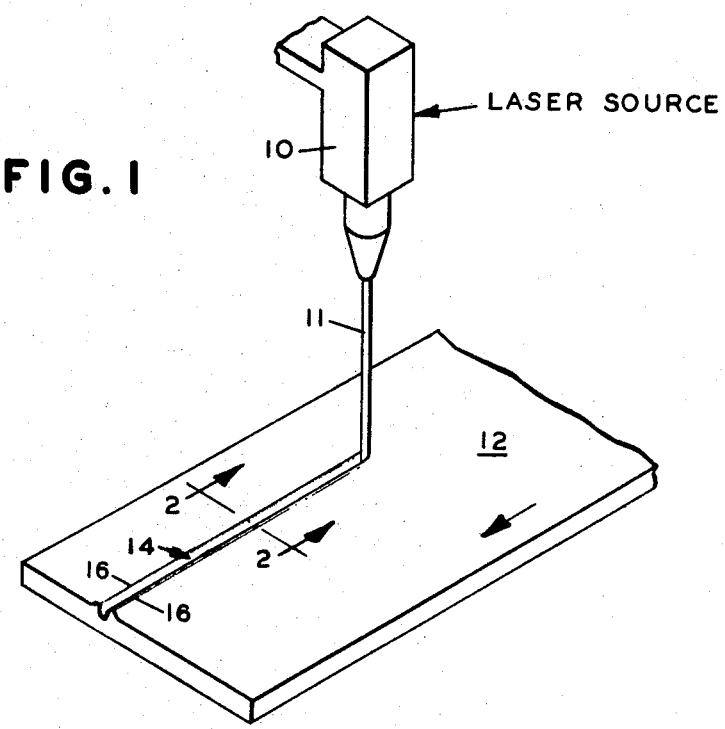
FIG. 1 is a schematic perspective view illustrated the laser scoring process.

Referring to the drawing, a laser source 10 preferably of the continuous wave type, is directed against a substrate 12 for the purpose of applying to it a score along a predetermined path. The substrate may be in the form of plastic film or sheet material. The substrate may, on the other hand, be also of somewhat thicker material such as plastic plate.

In one method of scoring the material 12, the substrate is moved while the laser source 10 is held stationary. The motion applied to the substrate 12 is such that the laser beam 11 generated by the laser source 10 cuts a score 14 along a predetermined path in the substrate. In another possible embodiment of the present invention, the substrate 12 is held stationary and the laser source has motion applied to it so that the directed beam 11 cuts the desired score 14.

When cutting or generating the score 14, it is essential that the laser beam 11 does not cut or penetrate entirely through the depth of the substrate or film 12. A score, by definition, is a groove into a material surface and penetrates only a portion of the total depth of the material being scored. As a result, it is essential to apply relative motion between the beam 11 and the material 12 being scored so that the concentrated beam is not focused on any given spot on the material 12, for too long a time.

Thus, if relative motion between the laser beam 11 and the material 12 is not sufficiently rapid, the laser beam 11 may cut through the entire depth of the material, or produce a groove which is deeper than that desired. If, on the other hand, the relative motion between the laser beam 11 and the substrate 12 is too rapid, the score or groove may not have a sufficient resulting depth. Accordingly, controlled motion must be applied between the material being scored and the laser beam so as to result in a score or groove of the desired dimensions. This relative motion between the two aforementioned elements may be realized, as already noted, by moving either one of the elements while maintaining the other element stationary. It is also quite feasible to apply motion to both of the elements. When both elements are set into motion, in this manner, such motion may be colinear, in one extreme, or may be at right angles, in another extreme case. When colinear, the motion results in a straight-line cut. When, on the other hand, the two motions are directed at right angles to each other, any desired configuration of the score or groove may be realized, depending upon the relative magnitudes of the velocities of the two elements. The method used for applying the relative motion depends upon the design of the laser source and the structure of the workbench or work base supporting the substrate 12.

In a typical embodiment, the beam from nitrogen-carbon dioxide laser is focused by reflecting mirrors to a spot about 3/16 inch wide, and directed onto a sheet of polyethylene film 6 mils thick. The laser output is continuous at approximately 30 watts. The plastic film is moved in front of the beam at a speed of 0.7 inch per second to result in a smooth and regular groove of about 0.125 inch wide.

Figure 2:
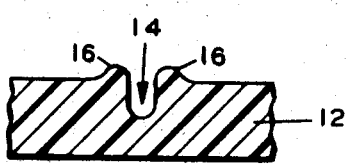
FIG. 2 is a sectional view taken along the line 2—2 in FIG. 1.

FIG. 2 shows a typical cross section of a score or groove generated by a laser beam 11 in the substrate 12. When the relative motion between the laser beam and the substrate 12 is of the correct velocity, a bead 16 forms along the sides of the score or groove. Aside from this bead, the score 14 has a neat and clean surface, remaining unscorched after the scoring process has ended.

TABLE I
Thermal and infra-red absorption properties of thermoplastics

| Material | Absorption constant at 10.6 $\mu$ cm.$^{-1}$ | Calculated heat input/ gm. required to melt (Joules) | Melting point, °C. |
| --- | --- | --- | --- |
| Polytetrafluoroethylene | | 398 | 327 |
| Polyethylene | 20 | 257 | 105-115 |
| Nylon 6/10 | 172 | 1170 | 256 |
| Polyvinyl chloride | | 183 | 100 |
| Polystyrene | 114 | 433 | 190 |
| Polycarbonate | 78 | | 250 |
| Polyethylene terephthalate | 194 | | 264 |

Table I lists the properties of a number of thermoplastic materials adaptable for scoring or grooving with laser beams of the nitrogen-carbon dioxide type. Polyethylene terphthalate absorbs the laser wavelength better than most of the other plastics. All of the plastics listed are moderate absorbers of this wavelength, and polyethylene absorbs the least. It is of advantage that the plastics are not strong absorbers of the laser light, because if they were, most of the light would be absorbed at or near the surface and little light would penetrate into the substrate.

The second date column in table I, lists the energy input per gram required to transfer the specified plastic to the molten state. This data already considers the effect of the melting point on the plastic and the latent heat of fusion if applicable. Except for nylon, the heat required to melt the plastics is approximately 300 j./gm. for all the materials for which data is presently available.

Two other factors which are pertinent in the scoring of plastic materials, are the thermal conductivity and the thermal diffusivity of the plastic. Thermal conductivity is a measure of how much heat a material will allow to pass through a given thickness per unit area under a unit temperature gradient. Thermal diffusivity is a measure of how fast the temperature gradient will be established in the material. The thermal conductivity and diffusivity of plastics are both low relative to metals. For scoring of plastics materials, low thermal diffusivity and conductivity are desired since they localize the heat input and permit easier vaporization of the substrate.

TABLE II
Grooving or scoring various plastic films with a continuous laser beam

| Material | Film thickness, mils | Sample speed, f.p.m. | Laser output, watts[1] | Backing |
| --- | --- | --- | --- | --- |
| Nylon 6 | 2 | 10 | 6.5 | Metal plate. |
| Polycarbonate | 10 | 3.0 | 6.5 | Air. |
| Do | 10 | 3.5 | 6.5 | Metal plate. |
| Polyethylene terphthalate | 2 | 11.74 | [2]1 | Do. |
| Polystyrene | 2 | 11.75 | [2]1 | Do. |
| Polyethylene | 2 | 6.75 | 6.5 | Do. |
| Do | 2 | 6.75 | [3]6.5 | Air. |
| Do | 6 | 4.1 | 6.5 | Air. |
| Do | 6 | 4.1 | 6.5 | Metal plate. |

[1] Beam focused by 2.5 inch focal length Ge lens.
[2] (Est.)
[3] No groove.

Experimental data encountered in the grooving of plastic films, is given in table II. When a groove or score is accomplished successfully, a bead is formed on both edges of the groove. The appearance of the groove is generally neat and regular, when accompanied by the bead. Microscopic examination of the grooves, furthermore, reveals the presence of small bubbles in the beads formed on the sides of the groove. In addition, small cracks may also be observed in the groove bottom and on the beaded edge of the polyethylene grooved at high-energy densities.

In general, the grooving process is not especially dependent upon the backup plate that may be used behind the sample. A metal backup plate behind the sample, however, permits grooving at a slightly greater rate than if no backup plate is used. The type of metal used for the backup plates is of no importance, except that smoother plates yield fewer pinholes in heavily grooved samples, than rough commercial steel plates. Pinholes are produced by the sharp points on the rough plates when forced through the soft plastic by sagging as a result of the softening of the workpiece by the beam. This applies to the condition when the groove depth is a large fraction of the film thickness.

The bubbles noted above, play an important role in the process of grooving or scoring plastics. In the grooving operation, the energy density in the laser beam must be such that the plastic is evaporated or decomposed while the relative motion between the beam and the sample is of the velocity whereby the groove does not extend entirely through the depth of the material. To accomplish this structure, precise control over the beam focus and the relative velocity is required. Thus, if the relative velocity is too high, a bead results rather than a groove, due to stress relaxation of the film. If, on the other hand, the relative velocity is too low, the material is cut rather than grooved or scored. The resulting size of the bubbles is a function primarily of the relative velocity between the plastic material and the scoring beam. This relative velocity determines the average energy density incident on the plastic material being scored. Time is also an important factor in the formation of bubbles. The time that a given region on the plastic material is molten, is determined by the relative velocity between the material and the beam. Thus, a lower velocity produces irradiated regions which are molten longer than regions corresponding to higher relative velocities. In a typical process for scoring polyethylene the relative velocity between material and the laser beam is 2 inches per second. Fairly large bubbles result in this process, and microscopic examination reveals that the bubbles are formed only on the film side facing the beam. The bubbles are about 6 mils wide. From the dimensions and geometry of the process, it is apparent that the groove is formed from the bubbles. The regions in the zone affected by the laser beam, and which are not part of the groove proper, are not thinner than the original film of material being used. Instead, these regions are thicker due to relaxation of the stresses in the film. The bubbles formed prior to groove formation appear to be the only bubbles formed in the grooving process by the laser beam. There are at least two possible sources from which the bubbles may arise. One possibility resides in the release of entrained gases or water vapor from the plastics in the molten region, with the bubbles forming due to pressure buildup on release of these gases. The second possibility rests on the condition that the internal temperature of the plastics may exceed the point at which the material degrades, and thereby result in the formation of small gaseous molecules. It is noted that the heat generation in laser irradiation of plastic is internal by absorption and not by conduction of heat from an outside surface.

In polyethylene, bubble formation occurs before the formation of the groove and not thereafter. If the bubbles result from the release of gas or moisture, they can probably form only once, since once the gas has been released, no additional bubbles form. The outer regions of the groove is molten longer than any other region affected by the laser. It appears therefore, that any bubbles forming after the material is sufficiently hot to be grooved, would be able to break and collapse after forming. The bubbles can collapse in the groove center because that region is hottest and molten for the longest period of time. In material other than polyethylene, bubble formation occurs throughout the grooving or scoring process.

The absorption of laser radiation during processing of plastic materials is of practical importance. Commercial polyethylene compounded with inorganic oxides such as titanium dioxide requires considerably less laser power than polyethylene without the oxides, for trimming applications. Accordingly, it is possible that materials added to weakly absorbing plastics and other matrices, may impart to the plastics greater absorbing properties at the given laser wavelength. Addition of such impurities may facilitate laser processing of materials not adapted to being worked in the pure state.

It is thought that the invention and many of its attending advantages will be understood from the foregoing description and it will be apparent that changes may be made in the steps of the method described and their order of accomplishment without departing from the spirit and scope of the invention or sacrificing all of its material advantages, the form hereinbefore described being merely a preferred embodiment thereof.

I claim:

1. A method for generating a groove in a thermoplastic, substrate material, comprising the steps of:

generating a concentrated beam of laser light of sufficient energy density to degrade the substrate material;

directing the laser beam against the surface of the substrate material; of such intensity that said beam does not cause substantial vaporization;

and moving the laser beam and the surface of the substrate material at a relative velocity, for the length of the desired groove, such that the laser beam degrades only a portion of the thickness of the thermoplastic material along the path of the desired groove to form the desired groove in the substrate material;

application of the laser beam at such intensity causing bubbles to evolve from the degraded portion of the substrate material and to accumulate along the sides of the groove while leaving the residual thickness of substrate material, along the path of the groove, substantially undegraded.

2. The process for generating a groove in a substrate as defined in claim 1 including the step of applying backing plate means to said substrate.

3. The process for generating a groove in a substrate as defined in claim 2 wherein said backing plate means is a metal plate.

* * * * *